June 28, 1966 T. H. KEEN 3,258,138
CONTAINER FOR CHARGING OPEN-HEARTH FURNACES
Original Filed Jan. 21, 1963 6 Sheets-Sheet 1

INVENTOR.
THOMAS H. KEEN
BY Kurt Kelman
AGENT

June 28, 1966 T. H. KEEN 3,258,138
CONTAINER FOR CHARGING OPEN-HEARTH FURNACES
Original Filed Jan. 21, 1963 6 Sheets-Sheet 2

INVENTOR.
THOMAS H. KEEN
BY Kurt Kelman
AGENT

June 28, 1966  T. H. KEEN  3,258,138
CONTAINER FOR CHARGING OPEN-HEARTH FURNACES
Original Filed Jan. 21, 1963  6 Sheets-Sheet 3

INVENTOR
THOMAS H. KEEN
BY
Kurt Kelman
AGENT

June 28, 1966 T. H. KEEN 3,258,138
CONTAINER FOR CHARGING OPEN-HEARTH FURNACES
Original Filed Jan. 21, 1963 6 Sheets-Sheet 5

INVENTOR.
THOMAS H. KEEN
BY Kent Kelman
AGENT

United States Patent Office 3,258,138
Patented June 28, 1966

3,258,138
CONTAINER FOR CHARGING OPEN-
HEARTH FURNACES
Thomas H. Keen, Penmark, near Barry, Wales, assignor
to G. K. N. Steel Company Limited, a British company
Original application Jan. 21, 1963, Ser. No. 252,652, now
Patent No. 3,212,653, dated Oct. 19, 1965. Divided
and this application Apr. 20, 1965, Ser. No. 457,895
Claims priority, application Great Britain, Jan. 24, 1962,
2,670/62; June 22, 1962, 24,051/62
10 Claims. (Cl. 214—35)

This application is a division of application Serial No. 252,652, filed Jan. 21, 1963, and now Patent No. 3,212,653, granted October 19, 1965.

This invention relates to the charging of open-hearth steel furnaces, and is concerned in particular with the charging of scrap metal, more especially steel scrap to open-hearth steel furnaces.

At present the usual method of charging scrap metal in particular steel scrap as well as other solid materials to open-hearth furnaces is to load the materials in open-mouthed containers of relatively small size usually having a capacity of the order of 30 cubic feet, these containers particularly in the case of steel and other metal scrap, being loaded at a scrap bay or other location remote from the melting shop, whereupon a large number of these small size containers are transported on a number of coupled together low loading wagons along rails leading from the scrap bay or other remote location to the charging platform at which several so loaded containers on each wagon commonly five containers to a wagon, are picked up by a charging machine which traverses the charging platform so as to pick up each of the loaded containers in turn, advance them in a horizontal direction through one of the charging openings of the open-hearth furnace, and thereupon invert the container so as to discharge the scrap metal or other contents into the melt; the charging machine repeating the charging operation for each of the several containers on each of the several wagons commonly eight to fifteen in all, the train of wagons being advanced from time to time up to the charging platform as the charging proceeds.

Such a method of charging open-hearth furnaces with solid material although it has been practiced universally for at least the past 40 years and in many cases for over a considerably longer period, has for a long time been known to be open to a number of serious objections. These objections principally are:

(1) The containers are of a relatively small capacity, their size being restricted by the relatively small size of the charging opening and the fact that it is necessary bodily to advance the whole of the container into the interior of the furnace.

(2) In consequence of the small capacity of the containers when loaded with scrap metal of an awkward shape or of a bulky nature, the weight of scrap metal in the container may be only a minor proportion of the maximum load capacity of the container so that the charging operation becomes very inefficient.

(3) The time taken to charge successive containers into the furnace is comparatively long and commonly results in a charging frequency over the whole charging period of 1 container every 2 minutes, and as in a furnace of 200 to 300 ton capacity, which is a very common furnace size, it is commonly necessary to supply no less than between 70 and 80 loaded containers to the furnace the total charging time may well be of the order of 2½ to 3 hours.

(4) The foregoing charging time commonly of the order of 3 hours is a substantial proportion of the total time for the entire furnace cycle which is commonly of the order of 8 to 10 hours, and material fed to the furnace at the beginning of this charging period will obviously be subjected to a considerably longer period of melting than material fed to the furnace at the end of the charging period, so that it is impossible uniformly and closely to control the melting of the whole of the charge and this is obviously undesirable in that a close control over the entire melting operation is desirable if the most satisfactory and most uniform product is to be obtained.

(5) Each time a container of this relatively small size is fed into the furnace the charging door must be fully opened so that the heat loss during the entire charging period of a single melt may be quite substantial.

The present invention has for its object the provision of a new or improved method of charging as well as a new or improved apparatus for charging, scrap metal, to open-hearth steel furnaces which is believed to avoid the whole of the foregoing disadvantages of the existing practice as above described.

According to the present invention I provide a method of charging scrap metal into an open-hearth steel furnace comprising the steps of:

A. Providing an elongated container having a discharge opening at one end namely, a discharge end thereof and a capacity including an overall dimension sufficiently great as to preclude complete insertion of the loaded container within the interior of the furnace through a charging opening thereof.

B. Loading the container with the scrap metal at a scrap bay or other loading location spaced away from the charging platform of the melting shop.

C. Transporting the so loaded container from the loading location on to the charging platform of the open-hearth furnace.

D. Engaging the discharge end of the container with fulcrum means on the furnace exterior adjacent the charging opening thereof so as to orientate the discharge opening of the container with a charging opening of the furnace.

E. Supporting part of the weight of the loaded container from the furnace and elevating the end of the container opposite to the discharge end while permitting of the discharge end fulcruming on the said fulcrum means carried by the furnace to dispose the container in a position in which it is downwardly inclined to the horizontal in a direction towards the charging opening of the furnace so as to be adapted to discharge scrap metal gravitationally through said charging opening.

F. Supporting the scrap metal from beneath for gravitational flow from the interior of the container at least substantially to the inner edge of the sill of said charging opening and, G. Effecting gravitational discharge of the scrap metal from the container into the furnace.

The present invention further comprises a method of charging scrap metal into an open hearth steel furnace comprising providing a mobile power driven vehicle having means displaceably supporting thereon an elongated container for scrap metal in both a lower transporting position and also an upper discharge position with the longitudinal axis of the elongated container downwardly inclined to the horizontal, said method further comprising the steps of:

A. Providing an elongated container having a discharge opening at one end namely, a discharge end thereof and a capacity including an overall dimension sufficiently great as to preclude complete insertion of the loaded container within the interior of the furnace through a charging opening thereof.

B. Loading the container with the scrap bay or other loading location spaced away from the charging platform of the melting shop.

C. Transporting the so loaded container by the vehicle from the loading location on to the charging platform of the open hearth furnace.

D. Maneuvering the vehicle on the charging platform so as to engage the discharge end of the container with fulcrum means on the furnace exterior adjacent the charging opening thereof and orientating the discharge opening of the container a charging opening of the furnace.

E. Elevating the end of the container opposite to the discharge end while fulcruming the discharge end of the container on the said fulcrum means carried by the furnace to dispose the container in a position in which it is downwardly inclined to the horizontal in a direction towards the charging opening of the furnace so as to be adapted to discharge scrap metal gravitationally through said charging opening.

F. Supporting the scrap metal from beneath for gravitational flow from the interior of the container at least substantially to the inner edge of the sill of said charging opening and, G. Effecting gravitational discharge of the scrap metal from the container into the furnace.

It is accordingly an essential and characteristic feature of the method of charging open hearth steel furnaces as above set forth that the container which is loaded at the scrap bay or other loading location is subsequently discharged through the or one of the charging openings of the furnace, i.e., the present invention specifically excludes from its ambit any method of charging in which the scrap metal is transferred from one container to another on or adjacent to the charging platform of the furnace.

The invention further comprises an open hearth steel furnace installation which is characterised by the combination of the following features:

i. The provision of a plurality of scrap and other solid material charging containers, each container being of elongated configuration having at one end thereof namely, a discharge end, a discharge opening with an associated discharge door and a capacity including an overall dimension sufficiently great as to preclude insertion of the loaded container through the charging opening of the furnace wholly into the interior of the furnace.

ii. Inter-engageable fulcrum means provided both on the furnace adjacent each charging opening thereof and on the container adjacent the discharge end thereof adapted to orientate the discharge end of the container with the charging opening of the furnace and permit of the container fulcruming relative to the furnace from a lower substantially horizontal position to an upper discharge position.

iii. Elevating means adapted to raise said elongated container from said lower substantially horizontal position to an upper discharge position, with the container fulcruming in so doing on said fulcrum means so as to raise the end of the container opposite to the discharge end into a position in which the container is inclined downwardly to the horizontal in a direction towards the discharge opening to effect gravitational discharge of its containers, and iv. Means on the container adapted to support the material from beneath during its gravitational flow from the interior of the container to a position at least substantially adjacent the inner edge of the sill of the charging opening.

The invention further comprises apparatus for charging an open hearth steel furnace with scrap and other solid material comprising:

i. A vehicle provided with supporting wheels driven from a power unit on the vehicle so that the latter can be advanced to the charging platform of the furnace from a loading position located away from said platform.

ii. A container of elongated configuration adapted to contain scrap and other solid material to be charged into the furnace.

iii. A discharge opening at one end namely, a discharge end of said elongated container.

iv. Means on the vehicle for detachably supporting said container, from the vehicle.

v. Fulcrum means on the container adjacent the discharge end adapted to permit of the container fulcruming relative to the furnace from a lower substantially horizontal position to an upper discharge position.

vi. Said vehicle supporting means being adapted to raise said elongated container from a lower transporting position to an upper discharge position about said fulcrum means in which in the direction of its length, the container is inclined downwardly to the horizontal in a direction towards the discharge opening to effect gravitational discharge of its containers, and vii. Means on the container adapted to support the material from beneath during its gravitational flow from the interior of the container to a position at least substantially adjacent the inner edge of the sill of the charging opening.

In the case where the container is detachably supported as above described from a vehicle the arrangement is such that the material can be loaded at a location spaced away from the furnace charging platform into a container separate from the vehicle, and the so-loaded container subsequently picked up by said vehicle supporting means and transported by the vehicle to the charging platform and advanced by the same vehicle to the charging opening of the furnace to effect gravitational discharge into the furnace of the material previously loaded into the container at a location spaced from the charging platform of the furnace of the material.

With the present invention insofar as the material is discharged gravitationally from the container through the charging opening of the furnace as opposed to the whole container being projected through the charging opening into the interior of the furnace, the container can be made of a much larger capacity than is possible with the existing method above referred to and may, for example, readily have a capacity of at least 150 cubic feet, and at least some four or five times and in many cases some ten or twelve times the capacity of the containers as at present used. It follows from this that the present invention provides the following advantages over the existing method of charging, namely:

a. As the capacity of each single container is very much larger it can much more readily and efficiently be filled to capacity with scrap metal of an awkward or bulky shape. Also as the container from which the material is to be discharged into the furnace can be loaded at leisure at the scrap bay or other location spaced away from the charging platform, there is ample time to orientate the material where this is of a bulky or awkward shape, so as to ensure that when the contents of the container are discharged, the material readily flows gravitationally from the container into the furnace. Quite apart from the facility for such orientation provided by the larger container which can be employed with the present invention, the present invention avoids the disadvantage of providing a specially designed charging machine of which the container forms an integral non-detachable part an arrangement which would necessitate very rapid filling of the container in order that the charging machine may be efficiently utilized and the furnace charging time reduced as far as possible, so that in the employment of such specially designed charging machine with its integral container, there is then no time available for orientating the bulky or awkward shapes of scrap material to facilitate its ready charging into the furnace.

b. Quite apart from the saving in charging time arising from the efficient use of each container, there is a further important saving of charging time by reason of the large mass of material which is fed into the furnace during the discharge of each single container to the furnace than is the case with the relatively small capacity containers hitherto employed.

c. The present invention eliminates the customary bulky and very costly and elaborately constructed furnace charging machine with its large number of small size separate containers as at present employed, and which traverses the charging platform; while the arrangement permits of the scrap metal being fed either simultaneously into the furnace through each of the several charging openings, or successively from each of a number of containers corresponding one to each charging opening over a very short period of time so that the whole charging operation of solid material, in particular scrap metal commonly of the order of 60 to 90 tons weight of scrap metal for each 200 ton total furnace charge, can be completed in a matter of a few minutes as opposed to some 2½ to 3 hours.

d. An important reduction in overall cycle time of the furnace can be effected, so that it is believed that with furnaces in continuous operation, as is of course the normal practice, six additional melts per working week can be obtained in ordinary open hearth steel furnace practice so that an important increase in output of a given size steel melting plant can be effected.

e. Insofar as the overall charging time is greatly reduced and the number of times during each melt that the charging doors have to be opened to receive the material is greatly reduced, an important reduction in heat loss through each charging opening is effected.

One of the difficulties in gravitationally charging an open hearth steel furnace is the width or thickness of the sill of the charging opening which may commonly be as great overall as some 4 ft., and it is essential that the material during charging should be supported from beneath as it flows gravitationally from the interior of the container to a position substantially adjacent the inner edge of the sill. If the material is not supported in this way it may build up on the sill and very rapidly jam or block the charging opening.

The foregoing feature of supporting the material from beneath as it advances from the container gravitationally into the furnace is, therefore, of considerable practical importance.

This support may be provided merely by a part of the discharge end of the container which is normally fixed in relation to the containers or it may be constituted by a telescopically extensible discharge chute to the container which is extended only at the commencement of the charging operation so as to project from the base of the container substantially to the inner edge of the sill, or it may be provided by fitting the discharge end of the container with an end discharge door which hinges downwardly about the adjacent discharge edge of the container base so as to provide an extension thereof, along which the material flows out of contact with the furnace sill.

Such supporting of the material from beneath during charging is also effectively ensured by the fact that the fulcrum means referred to orientate the discharge opening of the container with the charging opening to the furnace, and thus effectively avoids the material being inadvertently discharged onto the charging opening sill.

Having regard to the foregoing width of the sill of each charging opening of an open hearth steel furnace the present invention is considered to be particularly practicable as applied to the charging of open hearth steel furnaces of the tilting type which during charging can be tilted so that the plane of the charging opening is substantially perpendicular to the path of gravitational flow of the material from the container, i.e. so as to dispose the upper face of the sill at the same or substantially the same inclination to the horizontal as that of the container base in its charging position, which in practice is at least 27° to about 30° to the horizontal.

The invention is illustrated in the accompanying drawings, wherein:

FIGURE 3 is a plan view of the container depicted in FIGURES 1 and 2.

Referring to FIGURES 1 to 10 of the drawings the invention is here depicted as applied to the charging of an open hearth steel furnace 10, the particular furnace illustrated being what is known in the art as a tilting furnace and being provided in its front 11 in a known manner with a number of charging openings, one of which openings 12 is shown disposed in the known manner above a horizontal charging platform 13.

Figure 1:
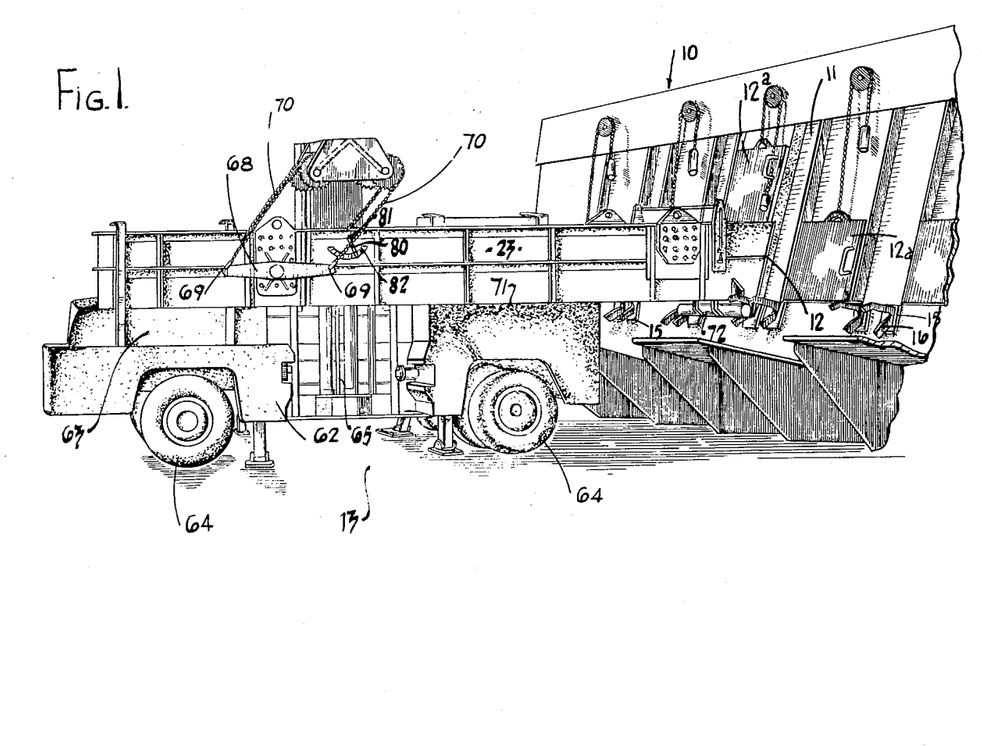
FIGURE 1 is a side elevation depicting one form of scrap metal container mounted on a mobile power driven vehicle, the container being depicted in the transporting position but with its discharge end orientated with and extending within a charging opening of an open hearth furnace.
Figures 2, 5:
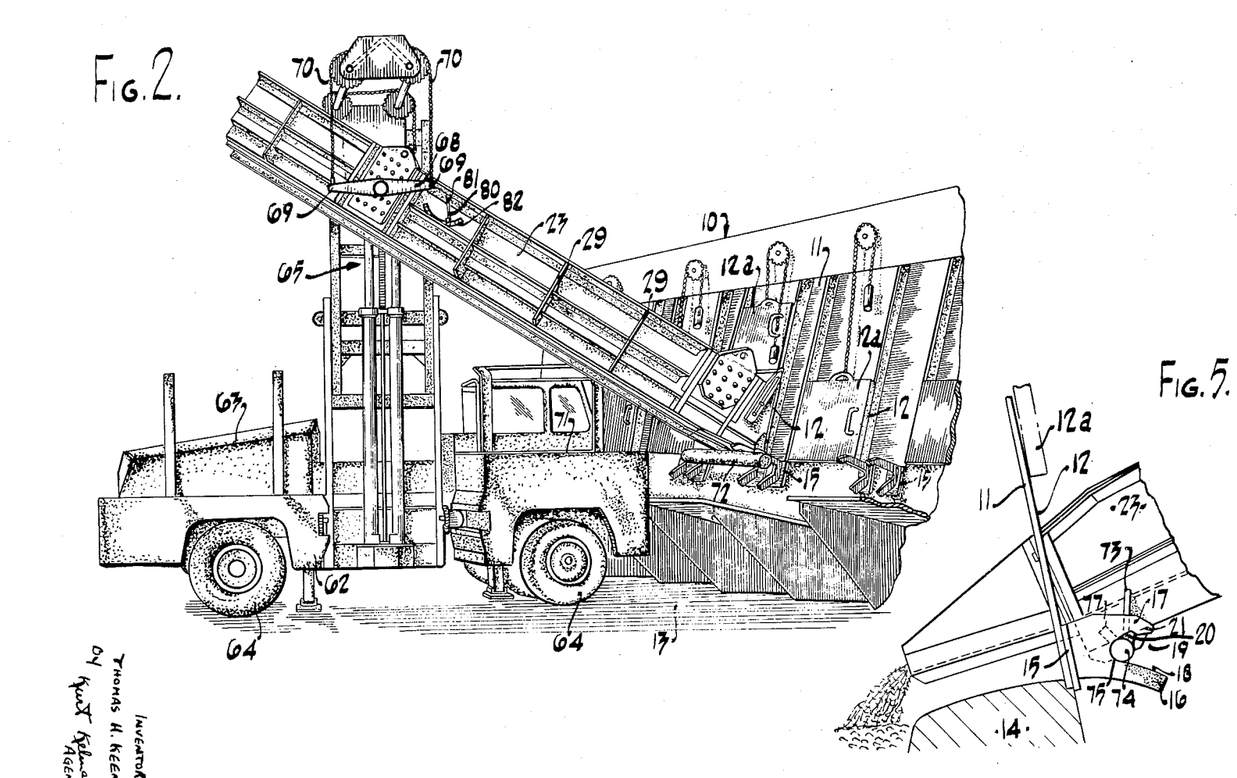
FIGURE 2 is a view similar to FIGURE 1 but showing the container raised into its discharge position.
FIGURE 5 is a detailed view of the fulcrum connection between the container and the furnace front showing the parts in the position corresponding to the raised or charging position of the container.

Each of these openings including the illustrated opening 12 is of the size conventional in open hearth furnace practice, i.e. each opening has a horizontal width of the order of four ft. and a height of the order of four ft. as measured from the upper edge of the sill 14 of the opening to the underside of the customary vertically movable charging opening door 12a, considering this as shown in FIGURES 1 and 2 in the fully open, i.e. fully raised position.

The sill 14 in accordance with customary open hearth furnace practice has a substantial width or thickness as measured in a substantially horizontal direction inwardly from the furnace front 11, such thickness in the construction illustrated being about 3½ ft.

Such furnace including its charging platform 13 as so far described is conventional, but pursuant to the present invention the furnace is provided on each side of each of the charging openings 12 with bearing bracket 15, the two bearing brackets associated with each charging opening 12 being horizontally aligned and disposed at a height substantially level with the upper edge of the adjacent sill 14.

Each of these bearing brackets 15 is adapted to provide fulcrum means for engaging with and orientating the discharge end of the scrap metal container as later described and as will be more particularly from FIGURE 5, each bracket 15 embodies two vertically spaced forwardly projecting arms 16, 17, the lower of these two arms 16 having its upper side 18 of bevelled configuration and being inclined downwardly to the horizontal in a direction towards the extremity of the arm 16, considering the tilting furnace 10 in its charging position as depicted in FIGURES 1 and 2.

There is thus provided between the two arms 16, 17 and each bearing bracket a trunnion receiving opening 19 which as shown extend into a recessed portion 20 formed in the adjacent lower side of the upper arm 17 which upper arm at its extremity is formed with a downwardly extending locking portion 21.

Figure 6:
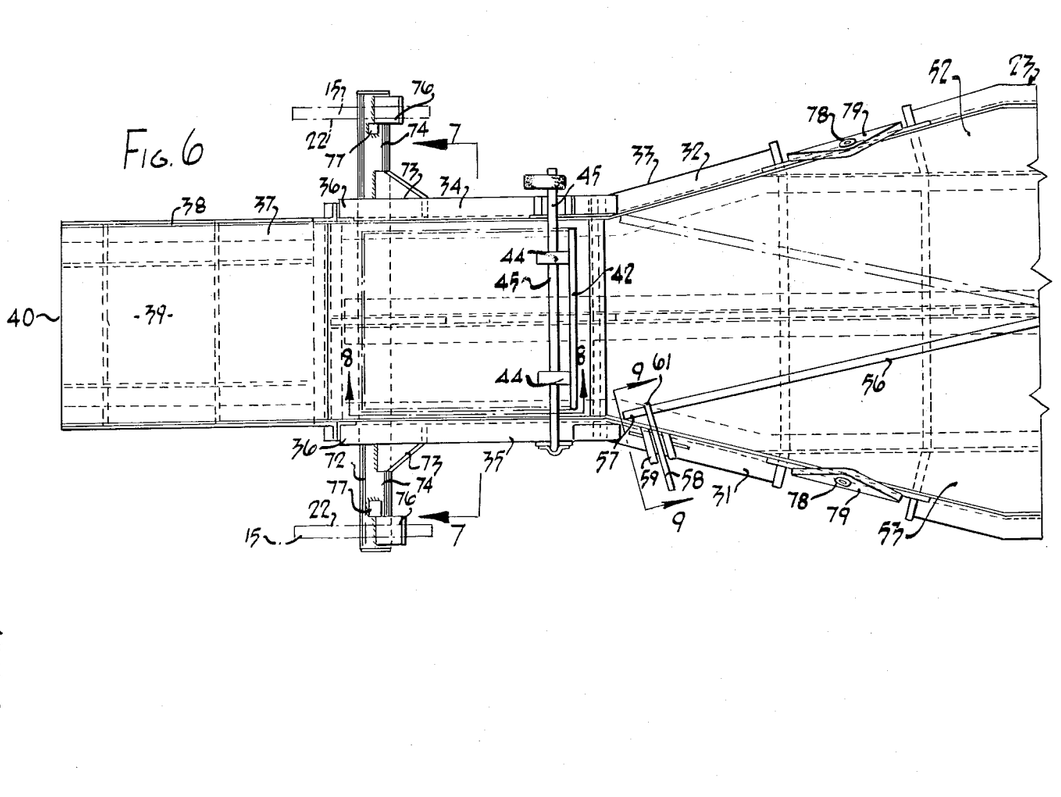
FIGURE 6 is a plan view to an enlarged scale of the discharge end of the container depicted in FIGURE 3, the container being disposed in the lower transporting position.

As will be apparent from FIGURE 6, the two brackets 15 adjacent each charging opening 12 are of flat form in cross section so as to have vertically extending side faces 22.

The furnace is provided with a number of containers in accordance with this invention for charging the scrap metal into the furnace and in practice the number of containers provided for each furnace will be dependent on the furnace size, size of scrap metal and other solid material charge and the container capacity. In the example here described the number of containers provided is equal to the number of charging openings of the furnace. Thus, where as is quite common the number of charging openings to each furnace are five, each furnace would be provided with five containers for the scrap metal, one of which is depicted at 23.

In the optimum operation of the present invention it is considered that complete scrap metal charging of a conventional open hearth furnace of capacity of the order of 200 to 300 tons for example, can be affected by means of a single charging operation through each of the several charging openings 12, from a container 23, in accordance with this invention so that as soon as each of the containers in number equal of the number of charging openings have each discharged their contents through a corresponding charging opening, the scrap metal charging of the furnace is completed.

As best shown in FIGURE 3, each scrap metal container 23 is of generally rectangular channel form in cross section comprising a flat base 24 and a pair of vertical sides 25, 26, with the upper side of the container being completely open.

As will be apparent from the drawings the container 23 is of markedly elongated configuration, the overall length of the material containing portion of the container, i.e. excluding its discharge end, being conveniently of the order of about 23 ft., the container having a vertical inside depth of the order of 2½ ft., and an inside width of rather more than 5 ft. except nearer its discharge end so that the storage capacity of the container is very considerable, a container of the foregoing preferred dimensions having a cubic capacity of the order of 300 cubic ft. so that each container is adapted to hold approximately 17 to 25 tons of steel scrap, the precise tonnage varying somewhat below and above this figure according to whether the scrap is in bulky or compact form.

The capacity of the container and thus its overall dimension is accordingly very substantial and is in fact so great that the loaded container is quite incapable of being fully inserted within the interior of the furnace 10 through one of the charging openings thereof so that the container, the subject of the present invention, is wholly different in that respect from the small size containers at present customarily used in charging open hearth furnaces and which are adapted to be disposed wholly within the furnace through one of the charging openings during the charging operation.

Figure 10:
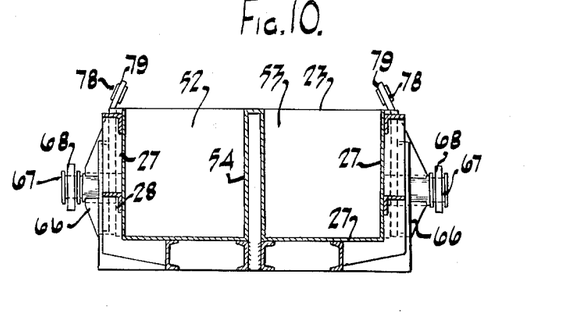
FIGURE 10 is a cross sectional view to an enlarged scale on the line 10—10 of FIGURE 3.

As best shown in FIGURE 10 each container is built up from plates 27 which provide the floor and sides of the container, these plates 27 being reinforced on their outer faces by reinforcing members 28 of angle and channel configuration which extend longitudinally of the container and are connected together at intervals along the length of the container by bracing plates 29 which extend along the vertical sides and beneath the floor of the container. As shown in FIGURE 3, one end 30 of the channel section container, namely the end remote from the discharge end, is closed and the two sides 25, 26 of the container although parallel to one another over the major length of the container converge towards one another at 31, 32, so that the container embodies a converging throat portion 33, the two converging parts 31, 32 of the container sides terminating in mutually parallel portions 34, 35, which constitute a container discharge end 36, which is also of rectangular channel form in cross section.

Figure 7:
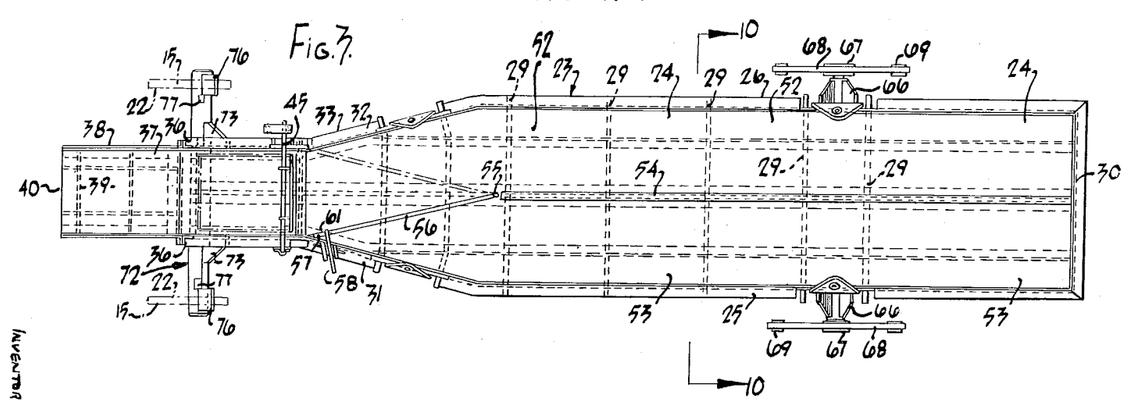
FIGURES 7, 8 and 9 are all cross sectional views on the lines 7—7, 8—8 and 9—9 respectively of FIGURE 6.

As will be apparent from FIGURES 3 and 7, this discharge end has an internal width substantially one-half of the internal width of the container at a position intermediate its converging throat portion and the outer or closed end 30 as will be readily apparent from a comparison between FIGURE 7 and FIGURE 10.

The discharge end 36 of the container is provided with a discharge nose or chute 37 also of rectangular channel configuration but having the upper edge 38 of its two sides downwardly inclined relative to the nose floor 39 in a direction towards the extremity 40 of the nose, the arrangement being such that the vertical depth of the nose extremity 40 is considerably less than the vertical inside depth of the container itself, e.g. this vertical depth of the nose extremity may be of the order of 6 ins.

Figure 4:
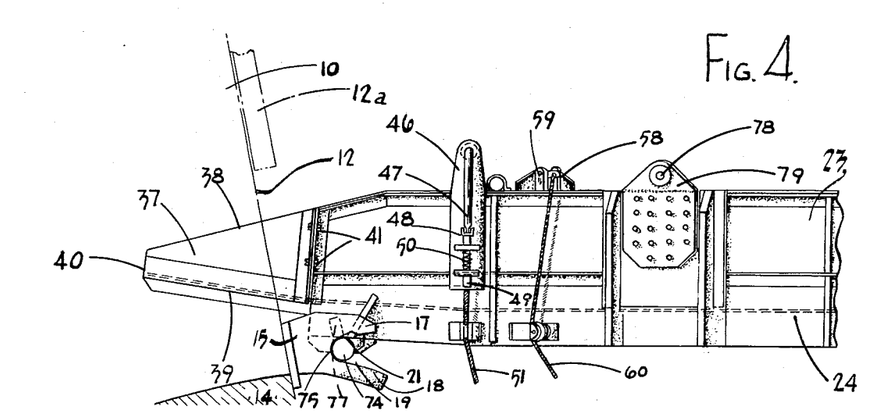
FIGURE 4 is a side elevation to an enlarged scale of the discharge end of the container depicted in FIGURE 1, the container being shown in the lower transporting position.

As shown in FIGURE 4, the floor or base 39 of the nose is inclined upwardly towards its extremity considering the container in the horizontal transporting position, and such upward inclination of the floor 39 and the aforementioned downward inclination of the upper edge 38 of each side of the nose facilitates the insertion of the nose within the charging opening 12 and further permits of the container being elevated from the horizontal transporting position depicted in FIGURE 1, to the inclined charging position depicted in FIGURE 2 without the underside of the nose floor 39 fouling the adjacent part of the charging opening sill 14.

The nose 37 is connected detachably to the adjacent part of the container by bolts 41, the arrangement permitting of the nose which is liable to warp and become damaged as a result of exposure to the furnace interior being replaced from time to time without replacing any other part of the container, but it should be understood that for the purpose of the present invention the nose 37 is considered to constitute an extension to the discharge end 36 of the container.

Figure 8:
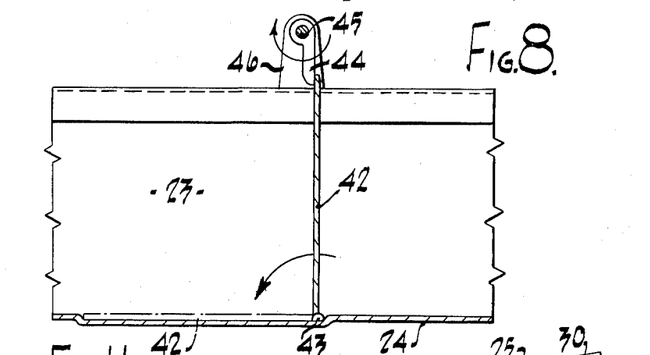

Adjacent to where the two converging sides 31, 32, of the container merge with the parallel sides 35, 34 of the discharge end 36, the latter is provided with a discharge door 42. As shown in FIGURE 8 this door is hinged at 43 along its lower edge to the adjacent part of the container floor 24 so as to be displaceable from the vertically upstanding closed position depicted in full outline in FIGURE 8 into the open or discharge position depicted in dashed line in this figure in which the door lies on the adjacent part of the container floor 24.

The door is releasably locked in its closed position by a pair of locking catches 44 mounted in spaced relation upon transversely extending spindle 45, the spindle being supported for rotation in trunnion brackets 46 carried on the two sides 34, 35, of the discharge end of the container and one end of the spindle which projects beyond one of these trunnions being formed as shown in FIGURE 4 with a dependent locking portion 47, the extremity of which is adapted to engage within the recessed end 48 of a vertically sildable locking bolt 49 loaded by spring 50 into the locking position illustrated in FIGURE 4, the bolt 49 being adapted to be pulled downwardly by discharge door release cable 51 to free the locking portion 47 whereupon the door 42 at once swings about its pivot 43 into the open position under the weight of the container contents considering the container in the inclined charging position depicted in FIGURE 2.

As has earlier been described, the width of the main portion of the container 23 is greater than, i.e. substantially twice the width of the discharge end 34. Such increased width in relation to the width of the discharge end 34 is provided to increase the bulk capacity of the container so as to permit of the part of the furnace adjacent each charging opening being charged completely by a single container without incurring the considerable expense of substantially increasing the overall size of charging openings of existing furnaces, and without making the container so long for this purpose as to become unwieldy. As so far described however, the provision of a discharge end of width less than the width of the container itself would be highly conductive to jamming of the container contents as these flow into such narrower discharge end during charging particularly having regard to the irregular and at times extremely bulky nature of each individual scrap component.

The foregoing potential difficulty is, however, wholly taken care of by dividing the container into two cells or compartments 52, 53, of equal width, i.e. corresponding to the width of the discharge end 36 by providing the container between the two parallel sides 25, 26 with a centrally upstanding dividing partition 54, supported from the container base 23 as shown in FIGURE 10.

This partition 54 extends continuously from the closed end 30 to a position adjacent the commencement of the converging throat 33 and here has hinged thereto at 55 for hinging movement about a vertical axis a compartment door 56 and which is adapted to swing about such axis 55 from its normal position depicted in full outline in FIGURES 3 and 6 in which it provides a closure for compartment 53 into the dashed line position depicted in FIGURE 6 in which compartment 53 is now open to the discharge end 36.

The length of the door 56 in a direction from its hinge 55 to its free edge 57 is such that in either of these two positions it is respectively parallel to the converging sides 32, 31 respectively.

Thus, considering the compartment door 56 in the full line position depicted in FIGURES 3 and 6, the width of the space along which during charging material is required to flow from compartment 52, is constant right up to and including the discharge nose 37 of the discharge end 36 and the same applies in the case of compartment 53 considering the door 56 in the other of its two positions, namely the dashed line position. It will further be noted that in each of these two positions the free edge 57 of the door 56 abuts against the adjacent converging side of the container throat 33 and the door tends to be held in such aforementioned desired position by the pressure of the material flowing to the discharge end of the container.

Figure 9:
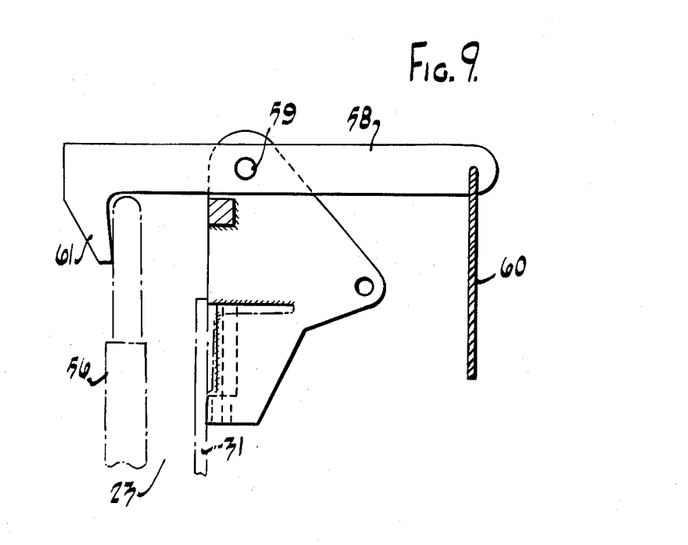

The door 56 is held in its normal full line position depicted in FIGURES 3 and 6 by a latch lever 58, see FIGURE 9, hinged at 59 to the adjacent converging side 31, the outer end of the lever being connected to compartment door pull cable 60 and it will be appreciated that when this cable is pulled, the nose 61 on the latching lever is raised to free the door 56.

The latching lever 58 can be of comparatively light construction since in practice referring to FIGURE 3 and considering the door 56 in the full line position, compartment 52 will be filled with material right up to the discharge door 42 so as to lie between door 56 and container side 32, thus taking part of the weight of the contents of the fully loaded compartment 53 considering the container in the inclined charging position. With such an arrangement compartment 52 would be emptied first and at once the latch 58 would be operated by cable 60 so that the compartment door 56 would at once under the weight of the contents in compartment 53, swing across the now empty compartments 52 into the dashed line position depicted in FIGURES 3 and 6 to effect discharge of compartment 53.

The container 23 as so far described, is adapted for mounting on a transporting vehicle 62 which is depicted in FIGURES 1 and 2. This transporting vehicle is provided with its own power unit designated generally at 63 which provides a power drive in the conventional manner to ground wheels 64 and such vehicle is accordingly adapted without separation of the container 23 off the vehicle to maneuver the container at the scrap bay or other loading location for the container spaced away from the melting shop in which the furnace 10 is located, the vehicle being further adapted to transport the so loaded container from the loading location on to the charging platform 13 of the melting shop and to maneuver the container on the charging platform into a position in which its discharge end 34 is aligned with the desired charging opening 12.

The vehicle 62 is further provided with elevating means 65 driven from the power unit 63. Such elevating means are adapted to be connected to the container 23 at a position substantially nearer to the closed end thereof 30 than the discharge end 36. Such vehicle 62 as so far described is known and the details thereof form no part of the present invention.

The vehicle elevating means 65 is connected to the aforementioned part of the container 23 by providing each of the sides 25, 26, thereof with transversely aligned elevating trunnion brackets 66 having transversely extending trunnion portions 67 on each of which is pivoted centrally of its length, lever 68. The two ends of each lever 68 are pivotally connected to lifting shackles 69 which through lifting cables generally designated at 70 in FIGURES 1 and 2 are connected to the elevating means 65 of the vehicle 62.

The vehicle 62 is further provided with abutment means 71 on which the underside of the container 23 intermediate the discharge end 36 and the lifting levers 68 is adapted to rest so as to support the loaded container in a stable manner in its horizontal transporting position as depicted in FIGURE 1.

The discharge end 36 of the container 23 is provided on its underside near its connection with the detachable nose 37 with a trunnion member 72 in the form of a stout circular shaft secured rigidly by bracing plate 73 to opposite sides of the discharge end of the container so that the trunnion member 72 extends perpendicularly transverse to the length of the container 23 immediately beneath the underside of the discharge end 36 adjacent its connection to the nose 37.

The trunnion member 72 has a length greater than the horizontal width of the charging opening 12 which horizontal width as earlier stated is appreciably greater than the width of the discharge end 36 of the container and the two end portions 74 of the trunnion member 72 are each adapted to extend between the two arms 16, 17 on one of the two brackets 15, provided at each side of the charging opening so that these portions 74 constitute trunnion portions adapted to engage pivotally with the inner end of the aforementioned bracket openings 19 which inner end is shaped to part circular configuration corresponding to that the trunnion member 72 to provide a part circular bearing surface 75, see FIGURE 5, on which the trunnion member 72 can fulcrum as the container is raised by the elevating means 65 on the vehicle 62 between the horizontal transporting position and the elevated charging position, in which position a substantial part of the entire weight of the loaded container 23 is carried by the brackets 15 in engagement with the trunnion portions 74.

Each of these trunnion portions 74 is provided with a locking lug 76 which extends away from the nose 37 so as to be upwardly inclined to the horizontal at an angle of around 30° considering the container itself horizontal and the extremity of each of these locking lugs 76 is adapted to extend within the aforementioned bracket recess 20 so as to over-lie the bracket locking portion 21 aforementioned, when the container 23 is in the inclined charging position so as then effectively to preclude any possibility of the trunnion member 72 becoming disengaged from the fulcrum brackets 15 during charging. As will be noted from FIGURE 4, when the container is in the horizontal transporting position, the upper side of each locking lug 76 is substantially flush with the upper side of the adjacent trunnion portion 74 so that the charging nose 37 of the container when horizontal can readily be projected into or withdrawn from the charging opening 12.

Each trunnion portion 74 at a position intermediate each locking lug 76 and bracing bracket 73 is provided with an upstanding locating lug 77 adapted to engage with the adjacent side face 22 of the corresponding fulcrum bracket 15 for the purpose of locating the discharge end 36 in a lateral sense relative to the charging opening.

The container 23 is provided intermediate its two ends with two pairs of lifting eyes 78 carried by lifting brackets 79 secured to each of the two sides 25 26, 31 32, of the container and these permit of the container, if detached at any time from the vehicle 62, being lifted by hoists such as travelling cranes as are customarily provided in the roof of the melting shop above the charging platform 13, thus permitting if desired of these hoists, maneuvering the loaded container into the horizontal position immediately prior to charging as depicted in FIGURE 1 and by suitable manipulation of the hoists of the container being brought into the inclined charging position depicted in FIGURE 2.

The container is further provided with an inclinometer comprising pointer 80 freely pivoted at its upper end 81 and which co-acts with angle measuring scale 82, whereby the inclination of the underside of the container to the horizontal in the charging position can readily be determined if desired and thus the degree of inclination controlled.

In operation, the containers 23 constructed as above described are loaded at the scrap bay or other loading location with the scrap metal usually steel scrap, to which may be added ore, limestone, coal, pig iron and other unmelted materials, loading being performed with the containers removed from the vehicle 62 unless maneuver of the container by the vehicle during loading is required. Any such maneuvering may of course be affected by the usual scrap bay hoists which would be connected to the lifting eyes 78. The loaded container as mounted on the vehicle 62, is now transported in the horizontal position depicted in FIGURE 1 to the charging platform 13 of the melting shop.

In a steel works of substantial size embodying a large number of open-hearth furnaces, it may be found most satisfactory to provide the same number of vehicles as there are charging openings to each single furnace thereby permitting of all of the containers for charging one furnace, namely the same number of containers as charging openings being assembled together on the appropriate section of the charging platform 13 and the several openings being charged successively one by each container with the minimum time interval between each charging operation a greater time interval being of course required in the event that only one vehicle is provided as in that case time must be taken between each charging operation to detach the empty container from a vehicle and to attach a full one. Where the same number of vehicles as charging openings are provided all of the openings may, if desired, be charged simultaneously. Where this preferred larger number of vehicles is provided it will be understood that subsequent to the charging of one furnace the same vehicles would then be used to charge other furnaces, the containers for which in the meantime had been loaded in the scrap bay while detached from the vehicles.

Whatever arrangement is adopted prior to charging the furnace 10 is tilted so as to raise its front 11 and bring the same into a position in which it is inclined to the vertical in a rearwardly upward direction relative to the charging platform 13, thus raising the fulcrum brackets 15 to a height in relation to platform 13 at which the bracket openings 19 are level with the trunnion portions 74 on the container considering the latter in its transporting position depicted in FIGURE 1. Such inclination of the furnace front 11 also facilitates the flow of the charged material towards the back of the furnace. Although it should be understood that if desired with the present invention it is perfectly possible to charge non-tilting open-hearth furnaces by increasing the vertical depth of the charging door opening to bring the container discharge end nose 37 clear of the sill 14 when in the charging position. As so applied, the bracket openings 19 of such non-tilting furnace would be so positioned as to be horizontally aligned with the trunnion portions 74 of the container as depicted in FIGURE 1.

The charging door 12a is now raised into the open position and the loaded container 23 in the horizontal transporting position depicted in FIGURE 1 is now advanced by its vehicle 62 with the trunnion member 72 level with the fulcrum bracket openings 19 until the trunnion member has engaged with the fulcrum brackets as shown in FIGURES 4 and 6 in which position the nose 37 of the discharge end 36 projects beyond the inner end of the sill 14 into the furnace interior.

In this position of the container 23, the latter is so disposed in relation to the vehicle 62 that the trunnion portions 67 are disposed at the vertical side of the vehicle elevating means 65 which is furthest from the furnace, such disposition being permitted by the flexible connection of the container to the vehicle by the lifting cables 70 which in this position of the container depicted in FIGURE 1 are in a downward direction inclined to the vertical away from the furnace. The cables 70 gradually approach a vertical position as depicted in FIGURE 2 as the elevating means 65 on the vehicle 62 is now operated to raise the container into the inclined charging position depicted in FIGURE 2, during which elevating movement the trunnion member 72 fulcrums as already described, on the fulcrum brackets 15. A large part of the weight of the loaded container is now taken by the fulcrum brackets 15. Elevation of the container is continued until as depicted in FIGURE 2, the floor 24 of the container is inclined to the horizontal, namely at an angle of at least about 27° to 30° or more than 30° if desired, i.e. as depicted in FIGURE 2, which angle of inclination is sufficient to ensure free gravitational flow of the material from the container into the furnace interior.

The cable 51 is now pulled to release the lock holding the discharge door 42 in the closed position, whereupon the door at once swings down into the horizontal open position under the weight of the container contents and compartment 52 empties with extreme rapidity, the emptying time for the entire compartment having capacity of the order of 9 to 14 tons being around one to two seconds. The cable 60 is now pulled to release compartment door 56 which at once swings into the dashed line position depicted in FIGURES 3 and 6 under the weight of the contents of the compartment 53 and which are of the order of 8 to 11 tons, which contents are discharged into the furnace in a similarly very short period of time. Thus, once the container has been disposed in the charging position depicted in FIGURE 2 the whole of the contents thereof amounting to approximately 17 to 25 tons in all in the example described may be discharged into the furnace in an overall time of some five seconds.

During the charging operation the base 39 of the nose 37 serves to support to scrap metal from beneath for gravitational flow from the interior of the container to the inner end of the sill 14 as will be apparent from FIGURE 5, in which the position of the inner end of the sill is depicted in relation to the extremity of the nose 40 up to which the base 39 extends. In other words the base 39 of the nose serves to ensure that the material is discharged into the furnace clear of the sill 14 at least as far as the inner end of the sill, i.e. there is no question of material being discharged on to the outer end of the sill adjacent the base of the charging opening 12, and thus blocking the charging opening, with the result that a portion of the contents of the container may then be discharged down the space between the tilting furnace front and the adjacent charging platform, or over the floor of the platform so as to impede the work of the melting shop.

It will further be understood from the foregoing description that the discharge of the material from the container 23 is effected entirely gravitationally, i.e. no form of pusher ram or equivalent device is provided for positively feeding the material from the container into the furnace.

Immediately the container is emptied as above described, the vehicle elevating means 65 is operated to return the container to the horizontal position so as to bring the trunnion locking lugs 76 clear of the fulcrum bracket locking portions 21 and permit of the container being withdrawn in the direction of its length clear of the charging opening, the door 12a to which would at once be closed so as to minimise heat loss. As shown in FIGURE 5, the mouth of each trunnion receiving opening 19 is substantially wider than the inner end thereof adjacent bearing portions 75 to facilitate the engagement and withdrawal of the trunnion portions 74 in relation to the fulcrum brackets 15.

With a container of the size and capacity aforementioned, the total time involved in initially orientating the discharge end 36 of the container and engaging its trunnion member with the brackets 15 as depicted in FIGURE 1, elevating the container into the charging position, charging the furnace and returning the container to the horizontal position and withdrawing it clear of the charging opening should not exceed two minutes. Thus, the charging door 12a of each charging opening should not be open during the complete scrap metal charging operation including the charging of any other unmelted materials in the container for a period of more than about two minutes, with the result that a very important saving in heat loss is effected with a marked saving in furnace fuel as compared with the existing laborious practice of charging by means of a large number of small size containers as earlier described.

Figure 11:
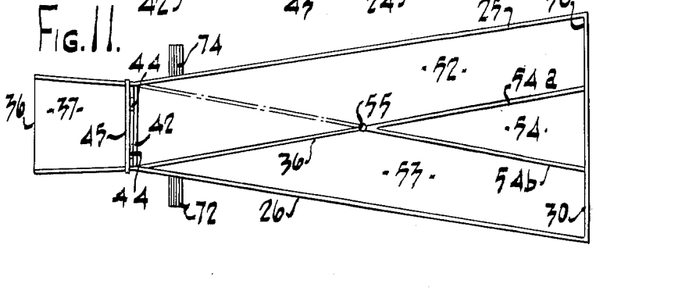
FIGURE 11 is a diagrammatic plan view of an alternative construction of container.

In FIGURE 11 is depicted a modified form of the container 23, in which for the reason earlier described the container is again provided with two compartments 52, 53, but instead of the two compartments extending parallel to one another they are mutually inclined so that the container is viewed in plan, i.e. as in FIGURE 11 is of V-configuration with the apex of the "V" at the discharge end 36. Such an arrangement permits of the outer sides 25, 26 of the two compartments being of straight configuration throughout their length right up to the discharge end 36, and as compared with the construction previously described provides during charging a straight flow path for the whole of the material from either compartment right up to the discharge end 36. The two compartments are of the same width through their length namely, by making the dividing partition 54 of similar V-configuration. Such straight flow path of the material as is obtained with the arrangement shown in FIGURE 11 facilitates the discharge of very long lengths of scrap metal, e.g., of length similar to the over-all length of each compartment and which might jam against the compartment or container sides in passing through the converging throat 33 of the construction depicted in FIGURES 3 and 6.

As shown in FIGURE 11 each of the two outer sides 25, 26 are not exactly parallel with the corresponding faces 54a and 54b of the dividing partition 54, each of the two sides 25, 26 diverging slightly relative to the corresponding partition member walls 54a, 54b in the direction from the closed end 30 of the container to the discharge end 36 so that the width of the discharge opening at the discharge end 36 is greater than the width of each compartment 52, 53 adjacent the closed end 30. The arrangement is accordingly such that the lateral walls at each compartment bounding each mass of material flowing out of each compartment are slightly diverging throughout the length of the compartment in the direction of flow right up to the position of discharge into the furnace, an arrangement which it is believed still further facilitates the discharge of the material from the container.

A further advantage of the FIGURE 11 construction is that by reason of the relative inclination of the two compartments the directions of discharge of the material from each compartment and which are respectively aligned with the length of each compartment 52, 53 are at the discharge nose 37 relatively inclined away from one another in a direction towards the furnace interior so that the material discharged from the two compartments is spread over a great area of the melting zone and a more uniform distribution of the scrap metal and other solid material therein is obtained.

Apart from the above specified modifications the construction and operation of the FIGURE 11 arrangement is similar to what has earlier been described.

What I claim then is:

1. A container for charging scrap metal into a steel furnace, said container being of elongated configuration and having a discharge opening at one end thereof, a discharge door to said discharge opening, said container embodying a plurality of compartments of elongated configuration extending in side-by-side relation along the length of the elongated container, said compartments being each adapted at one end thereof to communicate with the discharge opening to the container, closure means adapted to place one full compartment at a time in communication with said discharge opening and, the cross-sectional area of each compartment being not greater than the cross-sectional area of the container at a position intermediate each of said compartments and the discharge opening to the container.

2. Apparatus according to claim 1 including movable closure means common to a plurality of compartments and adapted in one or another of a plurality of positions thereof to place one or another of each of said compartments in communication with the discharge opening of the container.

3. Apparatus according to claim 1 comprising a central partition member extending along the length of the elongated container and dividing this into two compartments, a door hinged to the end of the partition member which is nearest to the discharge opening of the container, said door being adapted to provide a closure for one of the two compartments, the discharge door to said discharge opening being adapted to provide a closure for the other of the two compartments.

4. In apparatus for charging scrap metal into open hearth steel furnaces through the charging opening thereof,
   (a) a container for the scrap metal of elongated configuration,
   (b) said container having a discharge opening at one end thereof,
   (c) a discharge door to said discharge opening,
   (d) said container comprising a plurality of compartments of elongated configuration extending in side-by-side relation along the length of the elongated container, said compartments being each adapted at one end thereof to communicate with the discharge opening to the container,
   (e) closure means adapted to place one full compartment at a time in communication with said discharge opening,
   (i) and a furnace engageable fulcrum member on the container adjacent the discharge opening thereof extending transversely of the length of the elongated container.

5. Apparatus according to claim 2 wherein the container is provided with two compartments, said two compartments converging relatively in the direction of discharge of the material so as to be adapted to discharge the material along two relatively inclined paths which diverge relatively in the direction of discharge of the material from the discharge opening into the furnace interior.

6. Apparatus according to claim 5 wherein the container is of V-configuration comprising a pair of mutually converging outer side walls, and a pair of mutually converging inner side walls, the respective walls being of straight configuration throughout their entire length with one inner and one outer wall forming each of the two compartments and the width of which at a position furthest from the discharge end of the container is not greater than the width of said compartment at a position nearest the discharge end of the container.

7. In apparatus for charging scrap metal into open hearth steel furnaces through the charging opening thereof,
   (a) a container for the scrap metal of elongated configuration,
   (b) said container having a discharge opening at one end thereof,
   (c) a discharge door to said discharge opening,
   (d) said container comprising a plurality of compartments of elongated configuration extending in side-by-side relation along the length of the elongated container, said compartments being each adapted at one end thereof to communicate with the discharge opening to the container,
   (g) movable closure means common to a plurality of compartments and adapted in one or another of a plurality of positions thereof to place one or another of each of the said compartments in communication with the discharge opening of the container,
   (j) the width of said compartments increasing progressively throughout the length of the container in a direction towards the discharge opening thereof, and
   (k) the width of the discharge opening being greater than the width of each compartment at a position therein which is furthest from the discharge opening.

8. Apparatus according to claim 7 wherein the container is provided with two compartments, said two compartments converging relatively in the direction of discharge of the material so as to be adapted to discharge the material along two relatively inclined paths which diverge relatively in the direction of discharge of the material from the discharge opening into the furnace interior.

9. Apparatus according to claim 8 wherein the container is of V-configuration comprising a pair of mutually converging outer side walls, and a pair of mutually converging inner side walls, the respective walls being of straight configuration throughout their entire length with one inner and one outer wall forming each of the two compartments.

10. In apparatus for charging scrap metal into open hearth steel furnaces through the charging opening thereof,
   (a) a container for the scrap metal of elongated configuration,
   (b) said container having a discharge opening at one end thereof,
   (c) a discharge door to said discharge opening,
   (d) said container comprising a plurality of compartments of elongated configuration extending in side-by-side relation along the length of the elongated container, said compartments being each adapted at one end thereof to communicate with the discharge opening to the container,
   (g) movable closure means common to a plurality of compartments and adapted in one or another of a plurality of positions thereof to place one or another of each of the said compartments in communication with the discharge opening of the container,
   (j) the width of said compartments increasing progressively throughout the length of the container in a direction towards the discharge opening thereof,
   (l) and furnace engageable fulcrum means on the container adapted to permit of the container fulcruming relative to the furnace during the operating operation.

References Cited by the Examiner

UNITED STATES PATENTS 2,833,586  5/1958  McFeaters __________ 294—73

GERALD M. FORLENZA, *Primary Examiner.*

R. G. SHERIDAN, *Assistant Examiner.*